United States Patent
Price et al.

(10) Patent No.: US 9,574,025 B2
(45) Date of Patent: Feb. 21, 2017

(54) SOLUTION POLYMERIZATION PROCESS WITH IMPROVED ENERGY UTILIZATION

(71) Applicant: NOVA Chemicals (International) S.A., Fribourt (CH)

(72) Inventors: Terri A. Price, Calgary (CA); Fazle Sibtain, Calgary (CA); Eric Cheluget, Prospect Heights, IL (US)

(73) Assignee: NOVA Chemicals (International) S.A., Fribourg (CH)

( * ) Notice: Subject to any disclaimer, the term of this patent is extended or adjusted under 35 U.S.C. 154(b) by 0 days.

(21) Appl. No.: 15/021,796

(22) PCT Filed: Sep. 8, 2014

(86) PCT No.: PCT/IB2014/064323
§ 371 (c)(1),
(2) Date: Mar. 14, 2016

(87) PCT Pub. No.: WO2015/040522
PCT Pub. Date: Mar. 26, 2015

(65) Prior Publication Data
US 2016/0229930 A1    Aug. 11, 2016

(30) Foreign Application Priority Data
Sep. 19, 2013    (CA) ..................................... 2827839

(51) Int. Cl.
*C08F 10/02*    (2006.01)
*C08F 2/06*    (2006.01)
(Continued)

(52) U.S. Cl.
CPC .............. *C08F 10/02* (2013.01); *C08F 6/003* (2013.01); *C08F 6/02* (2013.01); *C08J 11/02* (2013.01)

(58) Field of Classification Search
CPC ................. C08F 2/06; C08F 6/10; C08F 6/12; C08F 10/02
See application file for complete search history.

(56) References Cited

U.S. PATENT DOCUMENTS

| 4,105,609 A | 8/1978 | Machon et al. |
| 4,379,882 A | 4/1983 | Miyata |
| (Continued) | | |

FOREIGN PATENT DOCUMENTS

CA    2 809 718 A1    9/2014

OTHER PUBLICATIONS

Kissin, Y.V.; The Kirk-Othmer Encyclopedia of Chemical Technology: Polyethylene, Linear Low Density; (2015) John Wiley & Sons, Inc. pp. 1-33.

(Continued)

*Primary Examiner* — Fred M Teskin
(74) *Attorney, Agent, or Firm* — Julie L. Heinrich

(57) ABSTRACT

A solution polymerization process that consumes less energy comprising: injecting feeds into one or more reactors to form a polyethylene in a single liquid phase, or optionally two liquid phases; deactivating the single or dual liquid phase; a first V/L separator separates the deactivated phase into a first bottom stream and a first overhead stream; the first overhead stream passes to a distillation column and the first bottom stream enters a second V/L separator, forming a second overhead stream and a second bottom stream; the second bottom stream enters a third V/L separator, forming a third overhead stream and a third bottom stream; the third bottom stream passes to polymer recovery; the second and third overhead streams are combined, condensed and purified, forming a purified solvent that is recycled to said reactors.

61 Claims, 2 Drawing Sheets

(51) Int. Cl.
    *C08F 6/10*         (2006.01)
    *C08F 6/12*         (2006.01)
    *C08F 6/00*         (2006.01)
    *C08F 6/02*         (2006.01)
    *C08J 11/02*       (2006.01)
    *B01D 3/00*        (2006.01)

(56) References Cited

U.S. PATENT DOCUMENTS

| | | |
|---|---|---|
| 4,731,438 A | 3/1988 | Bernier |
| 4,803,259 A | 2/1989 | Zboril et al. |
| 5,434,116 A | 7/1995 | Sone et al. |
| 5,554,775 A | 9/1996 | Krishnamurti et al. |
| 5,589,555 A | 12/1996 | Zboril et al. |
| 5,637,659 A | 6/1997 | Krishnamurti et al. |
| 6,180,730 B1 | 1/2001 | Sibtain et al. |
| 7,163,989 B2 * | 1/2007 | Friedersdorf .......... B01J 10/002 525/240 |
| 8,101,693 B2 | 1/2012 | Van Asseldonk et al. |
| 2010/0087609 A1 * | 4/2010 | Park ....................... C08F 10/00 526/170 |

OTHER PUBLICATIONS

Green, D.W. and Perry, R.H.; Perry's Chemical Engineers' Handbook: Section 13, "Distillation"; 8th Edition; 2008, McGraw-Hill, Accessed at: http://accessengineeringlibrary.com/browse/perrys-chemical-engineers-handbook-eighth-edition#p200139d899713__1001.

* cited by examiner

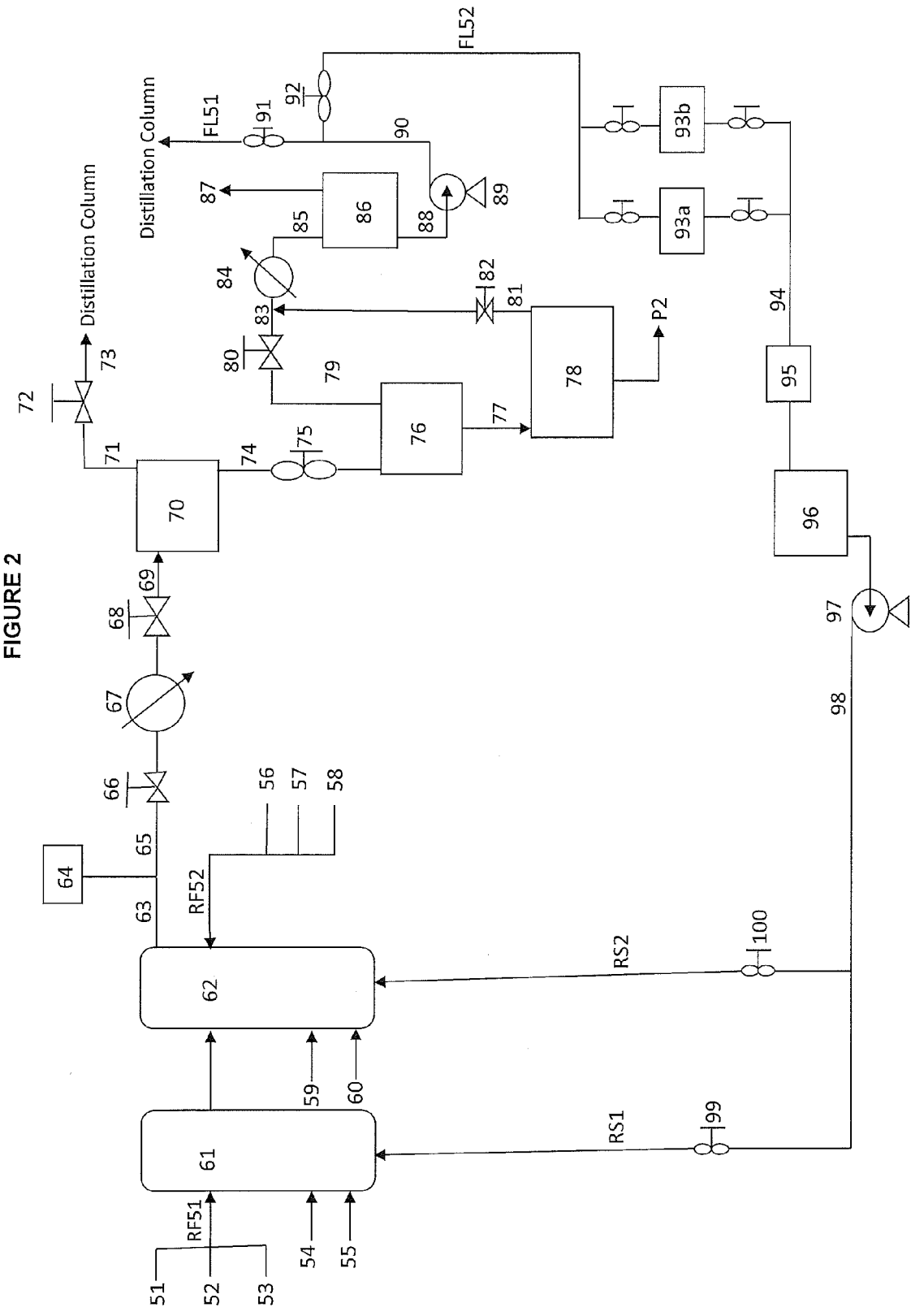

SOLUTION POLYMERIZATION PROCESS WITH IMPROVED ENERGY UTILIZATION

TECHNICAL FIELD

This invention relates to an improved solution polymerization process wherein the energy consumed is reduced and the capital cost of the polymerization plant is reduced. As the inventive solution polymerization process is producing polyethylene, energy savings are realized in the following utilities: reduced low pressure steam use, reduced high pressure steam use and reduced power consumption. As gaseous overhead streams from a secondary and tertiary vapor/liquid separators are condensed and recycled to one or more upstream reactors, energy consumption is reduced, or energy is saved, relative to passing the condensed gaseous overhead streams to a distillation column.

BACKGROUND ART

The continuous solution polymerization process is well known. Y. V. Kissin briefly discusses, in The Kirk-Othmer Encyclopedia of Chemical Technology, in an article titled "Polyethylene, Linear Low Density", a solution polymerization process. In the solution process, solvent, monomer(s) and catalyst are continuously fed to a reactor. The reactor can be operated over a relatively wide range of temperatures and pressures; producing a single liquid phase containing the desired polymer. Downstream of the reactor, the single liquid phase is phase separated to recover the solvent, unreacted ethylene and α-olefins (if present) from the polymer. In the phase separation step, a first vapor/liquid (hereafter V/L) separator operating at lower pressure, relative to the reactor(s), generates: a gaseous overhead stream of solvent, monomers, hydrogen (if present), light-end impurities and possibly some low molecular weight oligomers or grease, and; a bottom stream of an ethylene polymer rich solution and deactivated catalyst.

The gaseous overhead stream produced in the first V/L separator is typically transported to a process unit that separates the components into chemically distinct fractions. Various processes are known to accomplish this separation; for example a distillation column or two or more distillation columns connected in series. Such distillation operations may also include a cryogenic distillation column for the separation of ethylene. The distilled products, e.g. solvent, comonomer(s) and ethylene can be stored in tanks or vessels prior to being transported to the upstream solution polymerization process. Engineers experienced in the art are familiar with the design of distillation columns to accomplish specific separations, e.g. Perry's Chemical Engineers' Handbook (8th Edition), D. W. Green and R. H. Perry, 2008 McGraw-Hill, Section 13, "Distillation". The distillation operation is not particularly important to the success of this invention; however, this invention allows one to reduce the size and capacity of the distillation operation.

An earlier Canadian application (CA 2,809,718), that is related to this invention, discloses a process wherein a gaseous overhead stream from a first V/L separator is condensed and recycled to one or more upstream reactors in a more energy efficient manner; relative to passing this gaseous overhead stream to a distillation column.

The bottom stream produced in the first V/L separator may be transported to: i) a polymer recovery operation, or; ii) one or more additional V/L separators to remove additional solvent and optional comonomers. The subject matter of this application is focused on the latter, ii), as will be discussed in the invention summary below. Polymer recovery operations are not particularly important to the success of this invention. A typical polymer recovery operation includes a means for conveying the bottom stream, which is a viscous stream comprised essentially of molten ethylene polymer that contains a small amount of deactivated catalyst and residual solvent through a devolatilizing operation and ultimately through a pelletizer. Once pelletized, and optionally dried, the ethylene polymer is generally transported to a product silo. The means for conveying the bottom stream may include gravity, gear pumps, single screw extruders, twin screw extruders and sub-atmospheric pressure, vacuum extruders with vents that allow residual solvent or optional α-olefin comonomers to be removed.

The solution polymerization process is an energy intensive process. For example, relative to gas phase polymerization reactors, the solution polymerization reactor(s) run hotter, consume more steam and operate at higher pressures. A need exists to improve the energy efficiency of the continuous solution polymerization process. This invention describes embodiments of a continuous solution polymerization process that consumes less energy, relative to a base case solution polymerization process. Because less energy is consumed, manufacturing variable costs are reduced and the environment benefits, e.g., reduced greenhouse gas emissions. An added benefit of this invention is a reduction in the amount of capital required to build the continuous solution polymerization plant.

DISCLOSURE OF INVENTION

The present invention provides an improved continuous solution polymerization process wherein energy consumption is reduced, comprising the following steps;

i) injecting ethylene, one or more aliphatic hydrocarbon solvents, a catalyst, optionally one or more α-olefins and optionally hydrogen into one or more upstream reactors operating at a temperature and pressure to produce an ethylene polymer in a single liquid phase solution, or optionally a two liquid phase solution;

ii) injecting a catalyst deactivator, downstream of said one or more upstream reactors, into said single liquid phase solution, or optionally said two liquid phase solution, forming a deactivated reactor solution;

iii) passing said deactivated reactor solution through a heat exchanger to increase the temperature, passing said deactivated reactor solution through a pressure let down device and collecting said deactivated reactor solution in a first V/L separator forming a first bottom stream of ethylene polymer rich solvents, ethylene, deactivated catalyst and optional α-olefins and a first gaseous overhead stream of ethylene, solvents, oligomers, optional α-olefins and optional hydrogen;

iv) passing said first gaseous overhead stream to a distillation column, and passing said first bottom stream to a second V/L separator wherein a second gaseous overhead stream and a second bottom stream are formed;

v) passing said second bottom stream to a third V/L separator wherein a third gaseous overhead stream and a third bottom stream are formed, passing said third bottom stream, comprised essentially of molten ethylene polymer and deactivated catalyst to a polymer recovery operation;

vi) combining and condensing said second and said third gaseous overhead streams to form a recovered solvent comprised essentially of solvents, ethylene, optional α-olefins and impurities if present, and collecting said recovered solvent in a recovered solvent drum;

vii) passing from 0% to 40% of said recovered solvent to said distillation column and passing the remainder of said recovered solvent through a purification column to remove impurities, if present, forming a purified solvent;

viii) optionally passing said purified solvent through an analytical device wherein chemical composition is determined and collecting said purified solvent in a purified solvent drum;

ix) passing said purified solvent through a high pressure pump forming a pressurized solvent stream and injecting said pressurized solvent stream into said one or more upstream reactors.

The present invention further provides a process wherein the one or more upstream reactors are operated at a temperature from 80° C. to 300° C. and a pressure from 3 MPag to 45 MPag.

The present invention further provides a process wherein prior to entering said first V/L separator, in step iii), the temperature of said deactivated reactor solution is from 150° C. to 300° C. and the pressure is from 1.5 MPag to 40 MPag.

The present invention further provides a process wherein said first V/L separator operates at a temperature from 100° C. to 300° C. and a pressure from 1 MPag to 20 MPag.

The present invention further provides a process wherein said second V/L separator operates at a temperature from 100° C. to 300° C. and a pressure from 10 kPag to 1000 kPag.

The present invention further provides a process wherein said third V/L separator operates at a temperature from 100° C. to 300° C. and a pressure from 1 kPag to 500 kPag.

The present invention further provides a process wherein said recovered solvent drum, in step vi), is at a temperature from −25° C. to 60° C. and a pressure from 0.1 kPag to 100 kPag.

The present invention further provides a process wherein not more than 10% of said recovered solvent, formed in step vi), is passed to said distillation column and the remainder of said recovered solvent stream is passed through a purification column.

The present invention further provides a process wherein not more than 1% of said recovered solvent is passed to said distillation column and the remainder of said recovered solvent stream is passed through a purification column.

The present invention further provides a process wherein said purified solvent drum, in step viii), is at a pressure form 0.1 MPag to 3 MPag.

The present invention further provides a process wherein said pressurized solvent stream, formed in step ix), is at a temperature from −25° C. to 120° C. and a pressure from 3 MPag to 45 MPag.

The present invention further provides a process wherein the solvent used in the continuous solution polymerization process is one or more of $C_{5-12}$ alkanes, wherein the alkanes may be linear or branched, or a mixture of linear and branched alkanes.

The present invention further provides a process wherein said optional α-olefins are one or more $C_4$ to $C_8$ α-olefin.

The present invention further provides process wherein 0% to 100% of said pressurized solvent stream, formed in step ix), is fed to a first upstream reactor, and remaining pressurized solvent stream is fed to a second upstream reactor.

The present invention further provides a process wherein said catalyst used to polymerize said ethylene and said optional comonomer is a heterogeneous catalyst.

The present invention further provides a process wherein said catalyst used to polymerize said ethylene and said optional comonomer is a homogeneous catalyst.

The present invention further provides a process wherein single or multiple reactors are utilized and the catalysts used in each reactor may be the same or different; non-limiting examples of suitable catalysts include heterogeneous and homogeneous catalysts.

Phase separation in a continuous solution polymerization process may employ: i) a first V/L separator, or; ii) a first and a second V/L separator communicating in series, or; iii) a first, a second and a third V/L separator communicating in series, or; iv) more than three V/L separators communicating in series. The subject matter of this application deals with a continuous solution polymerization process employing phase separation ii), iii) or iv). More specifically, the subject of this application is the condensing and recycling of the gaseous overhead stream produced in the second V/L separator; or the combining, condensing and recycling of the gaseous overhead streams produced in a second and a third V/L separator; or the combining, condensing and recycling of the gaseous overhead streams produced in a second, third and fourth V/L separator, etc. Related to this invention, an earlier Canadian application (CA 2,809,718) discloses a process where the gaseous overhead stream from the first V/L separator was condensed and recycled in an energy efficient manner.

DEFINITION OF TERMS

Other than where otherwise indicated, all numbers referring to process conditions (temperature, pressure, etc.), quantities of ingredients, etc., used in the specification and claims are to be understood as modified in all instances by the term "about." Accordingly, unless indicated to the contrary, the numerical parameters set forth in the following specification and attached claims are approximations that can vary significantly depending upon the raw materials used or the desired ethylene polymer produced. At the very least, and not as an attempt to limit the application of the doctrine of equivalents to the scope of the claims, each numerical parameter should at least be construed in light of the number of reported significant digits and by applying ordinary rounding techniques.

It should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations. Similarly, a range of 0% to 100% is intended to include all sub-ranges between and including the recited minimum value of 0% and the recited maximum value of 100%; that is, having a minimum value equal to or greater than 0% and a maximum value of equal to or less than 100%.

In order to form a more complete understanding of the invention, the following terms are defined and should be used with the accompanying figures, the detailed description of the various embodiments and the claims.

As used herein, the term "monomer" refers to a small molecule that may chemically react and become chemically bonded with itself or other monomers to form a polymer. Non-limiting examples of monomers include ethylene (ethene), propylene (propene) and $C_4$ to $C_{12}$ α-olefins.

As used herein, the term "polymer" refers to a macromolecule composed of one or more monomers connected together by covalent chemical bonds. The term polymer is meant to encompass, without limitation, homopolymers (containing one type of monomer), copolymers (containing two monomer types), terpolymers (containing three monomer types) and quatropolymers (containing four monomers types), etc.

As used herein, the term "ethylene polymer", refers to polymers produced from the ethylene monomer and optionally one or more additional monomers. The term ethylene polymer is meant to encompass, ethylene homopolymers, ethylene copolymers, ethylene terpolymers and ethylene quatropolymers, etc. Other commonly used terms to describe ethylene polymers include, but are not limited to, high density polyethylene (HDPE), medium density polyethylene (MDPE), linear low density polyethylene (LLDPE), very low density polyethylene (VLDPE), ultralow density polyethylene (ULDPE), plastomer and elastomers.

The term "heterogeneously branched ethylene polymer" or "heterogeneous ethylene polymer" refers to a subset of the ethylene polymer group that are produced using Ziegler-Natta or chromium catalysts.

The term "homogeneously branched ethylene polymer" or "homogeneous ethylene polymer" refers to a subset of the ethylene polymer group that are produced using a single site catalyst or metallocene catalyst. It is well known to those skilled in the art, that the homogeneous ethylene polymer group is frequently further subdivided into "linear homogeneous ethylene polymer" and "substantially linear homogeneous ethylene polymer". These two subgroups differ in the amount of long chain branching. More specifically, linear homogeneous ethylene polymers have an undetectable amount of long chain branching; while substantially linear ethylene polymers have a small amount of long chain branching, typically from 0.01 long chain branches/1000 carbons to 3 long chain branches/1000. A long chain branch is defined as a branch having a chain length that is macromolecular in nature, i.e., the length of the long chain branch can be similar to the length of the polymer back-bone to which it is attached. In this disclosure, the term homogeneous ethylene polymer includes both linear homogeneous ethylene polymers and substantially linear homogeneous ethylene polymers.

As used herein, the term "oligomers" refers to an ethylene polymer of low molecular weight, e.g., an ethylene polymer with a weight average molecular weight ($M_w$) of about 2000 to 3000 daltons. Other commonly used terms for oligomers include "wax" or "grease". In a solution polymerization process the presence of oligomers in the process solvent can be problematic, e.g., oligomers may deposit on and foul heat transfer surfaces.

As used herein, the term "V/L" refers to a vapor/liquid separator, wherein a process stream enters the V/L separator (vessel or tank) and is separated into two streams; wherein one stream is ethylene polymer rich and the other stream is solvent rich.

As used herein, the term "light-end impurities" refers to chemical compounds with relatively low boiling points that may be present in the various vessels and process streams within a continuous solution polymerization process; non-limiting examples include, methane, ethane, propane, butane, nitrogen, $CO_2$, chloroethane, HCl, etc.

As used herein the term "oxygenated impurities", refers to trace amounts of water, fatty acids, alcohols, ketones, aldehydes, etc.; such impurities are potential catalyst deactivating poisons.

As used herein, the term "heavy impurities" refers to linear or branched, saturated or unsaturated, $C_8$ to $C_{30}$ hydrocarbons.

BRIEF DESCRIPTION OF DRAWINGS

FIG. 2 is a schematic of one embodiment of an inventive continuous solution polymerization process where gaseous overhead streams 79 and 81 produced in V/L separators 76 and 78 are combined and condensed; from 0 to 40% of the condensed stream flows to a distillation column through line FL51

BEST MODE FOR CARRYING OUT THE INVENTION

Figure 1:
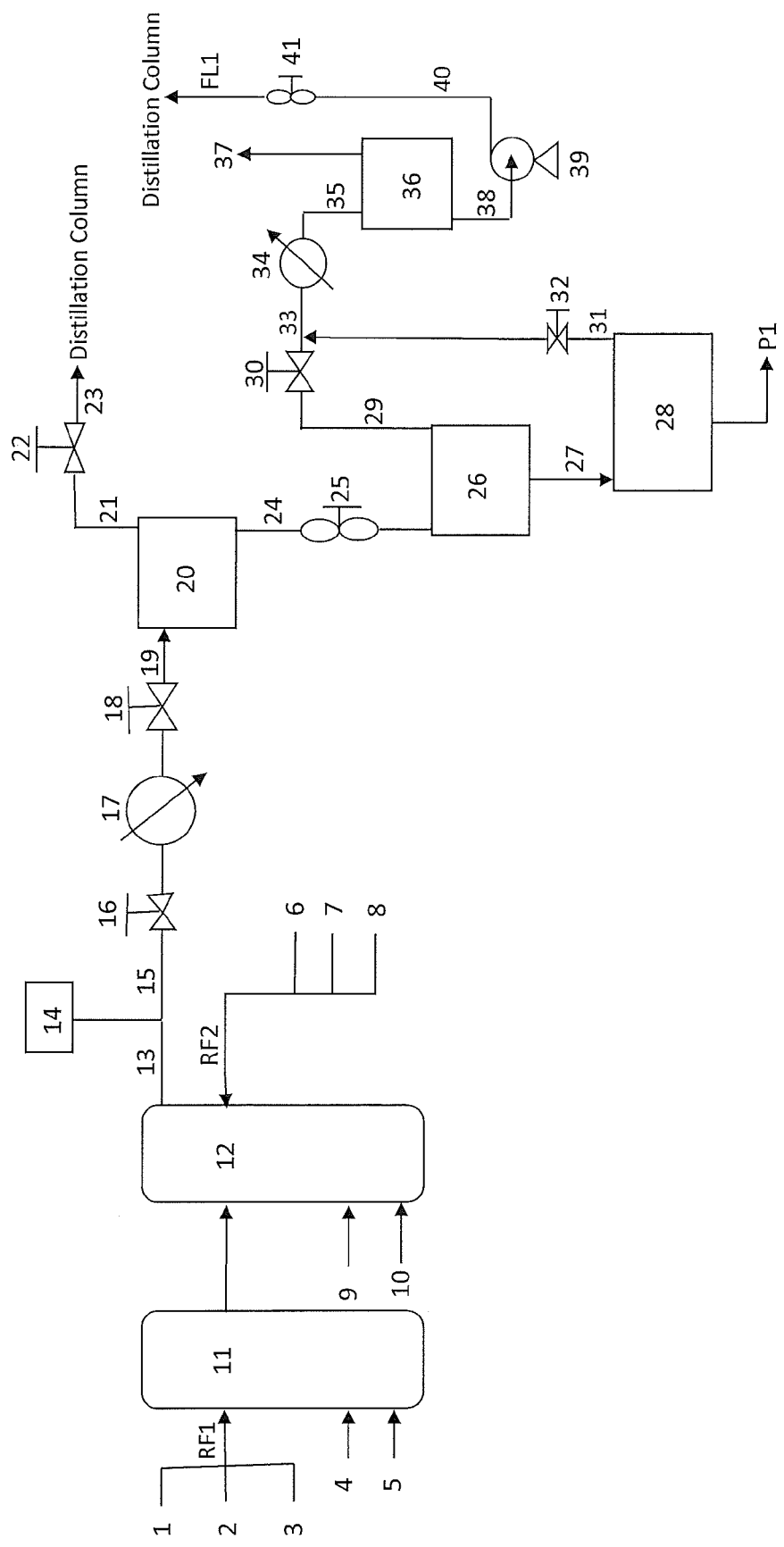
FIG. 1 is a schematic of a non-inventive base case continuous solution polymerization process where gaseous overhead streams 29 and 31, produced in a second 26 and third V/L separator 28 are condensed and flow to a distillation column through line FL1.

One embodiment of the present invention will be described in conjunction with FIG. 2. The comparative, or base case, continuous solution polymerization process is shown in FIG. 1.

In FIG. 1, solvent 1, ethylene 2 and optional α-olefin 3 are combined to produce reactor feed RF1, which is injected into reactor 11. A variety of solvents are suitable; non-limiting examples include linear or branched $C_5$ to $C_{12}$ alkanes. Non-limiting examples of α-olefins include 1-butene, 1-pentene, 1-hexene and 1-octene. Catalyst is injected into reactor 11 through line 4. The catalyst used is not especially important to the success of this invention, suitable catalysts are described below. Optionally hydrogen may be injected into reactor 11 through line 5; in general, hydrogen is added to terminate propagating polymer chains. Hydrogen is frequently used as an agent to control the molecular weight of the ethylene polymer. Any combination of the six lines feeding reactor 11 (lines 1 through 5 and line RF1) may or may not be heated or cooled.

The continuous solution polymerization process in FIG. 1 shows a non-limiting example of two reactors, reactor 11 and reactor 12. The number of reactors is not particularly important, providing there is at least one reactor. Fresh feeds are injected into reactor 12; solvent 6, ethylene 7 and optional α-olefin 8 are combined to produce reactor feed RF2. Catalyst is injected into reactor 12 through line 9. The catalyst injected into reactor 12 may be the same or different from the catalyst injected into reactor 11. Optionally hydrogen may be injected into reactor 12 through line 10. Any combination of the six lines feeding reactor 12 (lines 6 through 10 and line RF2) may or may not be heated or cooled.

The operating temperature of reactor 11 and 12 can vary over a wide range. For example, the upper limit on reactor temperature may be 300° C., in some cases 280° C., and in other cases 260° C.; and the lower limit on reactor temperature may be 80° C., in some cases 100° C., and in other cases 125° C. Typically, reactor 12 (the second reactor) is operated at a slightly higher temperature than reactor 11; e.g. reactor 12 is typically 5° C. to 25° C. hotter than reactor 11. The residence time in the reactor depends on the design and capacity of the reactor. Reactor residence time is typically less than 15 minutes, in some cases less than 10 minutes and in other cases less than 5 minutes. The operating pressure of reactor 11 and 12 can vary over a wide range. For example, the upper limit on reactor pressure may be 45 MPag, in some cases 30 MPag, and in other cases 20 MPag; and the lower limit on reactor pressure may be 3 MPag, in some cases 5 MPag, and in other cases 7 MPag.

The continuous solution polymerization reactors 11 and 12, shown in FIG. 1, produce stream 13 which contains an ethylene polymer in a single liquid phase solution, or optionally, under some operational circumstances, a two liquid phase solution. Stream 13 may also contain ethylene, active catalyst, deactivated catalyst, optional α-olefin, optional hydrogen and light-end impurities if present.

A tank 14 contains a catalyst deactivator. Non-limiting examples of the contents of tank 14 include: neat (100%) catalyst deactivator, a solution of catalyst deactivator in a solvent, and; a slurry of catalyst deactivator in a liquid. Non-limiting examples of suitable solvents and liquids include linear or branched $C_5$ to $C_{12}$ alkanes. How the catalyst deactivator is added is not particularly important to the success of this invention. Once added, the catalyst deactivator substantially stops the polymerization reaction by changing the active catalyst to an inactive form. Suitable deactivators are well known in the art, non-limiting examples include: amines (e.g. U.S. Pat. No. 4,803,259 to Zboril et al.); alkali or alkaline earth metal salts of carboxylic acid (e.g. U.S. Pat. No. 4,105,609 to Machan et al.); water (e.g. U.S. Pat. No. 4,731,438 to Bernier et al.); hydrotalcites, alcohols and carboxylic acids (e.g. U.S. Pat. No. 4,379,882 to Miyata); or a combination thereof (U.S. Pat. No. 6,180,730 to Sibtain et al.). In general, the catalyst deactivator is added in the minimal amount required to substantially deactivate the catalyst and quench the polymerization reaction. A minimal amount of catalyst deactivator minimizes cost and minimizes the amount of un-reacted catalyst deactivator present in process streams.

The number of reactors is not particularly important to the success of this invention. In addition, the shape or design of the reactors is not particularly important; for example, unstirred or stirred spherical, cylindrical or tank-like vessels can be used, as well as recirculating loop reactors or tubular reactors. Optionally, one or more tubular reactors may be placed after the second reactor 12 shown in FIG. 1, as described in U.S. Pat. No. 8,101,693 issued Jan. 24, 2012 to Van Asseldonk et al., assigned to NOVA Chemicals (International) S.A. More specifically, stream 13 in FIG. 1, would flow into the tubular reactor(s) and the stream exiting the tubular reactor(s) would be deactivated forming stream 15.

Adding the catalyst deactivator to stream 13 produces a deactivated reactor solution, stream 15. Stream 15 passes through pressure let down device 16, heat exchanger 17, pressure let down device 18, forming a higher temperature and lower pressure deactivated reactor solution 19 that enters a first V/L separator 20. Prior to entering the first V/L separator, the deactivated reactor solution 19 may have a maximum temperature of 300° C., in some cases 290° C. and in other cases 280° C.; while the minimum temperature of the deactivated reactor solution could be 150° C., in some cases 200° C. and in other cases 220° C. Prior to entering the first V/L separator, the deactivated reactor solution 19 may have a maximum pressure of 40 MPag, in some cases 25 MPag, and in other cases 15 MPag; while the minimum pressure could be 1.5 MPag, in some cases 5 MPag, and in other cases 6 MPag.

In the first V/L separator 20 two streams are formed: a first bottom stream 24, comprised of an ethylene polymer rich solvent, ethylene, deactivated catalyst and optional α-olefin, and; a first gaseous overhead stream 21 comprised of ethylene, solvent, oligomers, optional α-olefins, optional hydrogen and light-end impurities if present. The first V/L separator 20 may be operated over a relatively broad range of temperatures and pressures. For example, the maximum operating temperature of the first V/L separator may be 300° C., in some cases 285° C., and in other cases 270° C.; while the minimum operating temperature of the first V/L separator may be 100° C., in some cases 140° C. and in other cases 170° C. The maximum operating pressure of the first V/L separator may be 20 MPag, in some cases 10 MPag, and in other cases 5 MPag; while the minimum operating pressure of the first V/L separator may be 1 MPag, in some cases 2 MPag, and in other cases 3 MPag.

In FIG. 1, 100% of the first gaseous overhead stream 21 passes through pressure control valve 22 and is sent to a distillation column via line 23.

The first bottom stream 24 passes through level control valve 25 and enters a second V/L separator 26. The second V/L separator may be operated over a relatively broad range of temperatures and pressures. For example, the maximum operating temperature of the second V/L separator may be 300° C., in some cases 250° C., and in other cases 200° C.; while the minimum operating temperature of the second V/L separator may be 100° C., in some cases 125° C. and in other cases 150° C. The maximum operating pressure of the second V/L separator may be 1000 kPag, in some cases 900 kPag, and in other cases 800 kPag; while the minimum operating pressure of the second V/L separator may be 10 kPag, in some cases 20 kPag, and in other cases 30 kPag. As shown in FIG. 1, the second V/L separator 26 produces two streams: a second bottom stream 27 comprising an ethylene polymer, solvent, ethylene, deactivated catalyst and optional α-olefins; and a second gaseous overhead stream 29 comprised of solvent, optional α-olefins, ethylene and impurities if present.

The second bottom stream 27 flows into a third V/L separator 28. The third V/L separator may be operated over a relatively broad range of temperatures and pressures. For example, the maximum operating temperature of the third V/L separator may be 300° C., in some cases 250° C., and in other cases 200° C.; while the minimum operating temperature of the third V/L separator may be 100° C., in some cases 125° C. and in other cases 150° C. The maximum operating pressure of the third V/L separator may be 500 kPag, in some cases 150 kPag, and in other cases 100 kPag; while the minimum operating pressure of the third V/L separator may be 1 kPag, in some cases 10 kPag, and in other cases 25 kPag. In the third V/L separator 28 two streams are formed: a third bottom stream P1, comprised essentially of a molten ethylene polymer and deactivated catalyst, and; a third gaseous overhead stream 31 comprised of solvent, optional α-olefins, ethylene and impurities if present.

The third bottom stream P1, shown in FIG. 1, proceeds to polymer recovery. Non-limiting examples of polymer recovery operations include one or more gear pump, single screw extruder, twin screw extruder or devolatilizing extruder that force the molten ethylene polymer through a pelletizer. A devolatilizing extruder may be used to remove small amounts of solvent and optional α-olefin, if present. Once pelletized the solidified ethylene polymer is optionally dried and generally transported to a product silo.

As shown in FIG. 1, the second gaseous overhead stream 29, produced in the second V/L separator 26, and the third gaseous overhead stream 31, produced in the third V/L separator 28, pass through pressure control valves 30 and 32, respectively, and are combined to form stream 33. Stream 33 is condensed in condenser 34 forming a condensed recovered solvent stream 35. The recovered solvent stream is collected in a recovered solvent drum 36. The recovered solvent drum is vented to a flare through vent line 37. The maximum operating temperature of the recovered solvent drum may be 60° C., in some cases 50° C., and in other cases 25° C.; while the minimum operating temperature of the recovered solvent drum may be −25° C., in some cases −10° C. and in other cases 0° C. The maximum operating pressure of the recovered solvent drum may be 100 kPag, in some cases 50 kPag, and in other cases 20 kPag; while the minimum operating pressure of the recovered solvent drum may be 0.1 kPag, in some cases 0.5 kPag, and in other cases 1 kPag. Via pump inlet line 38 and pump outlet line 40, pump 39 pumps the recovered solvent to a distillation column through line FL1 via flow controller 41.

One embodiment of this invention is shown in FIG. 2.

In FIG. 2, solvent 51, ethylene 52 and optional α-olefin 53 are combined to produce reactor feed RF51, which is injected into reactor 61. Catalyst is injected into reactor 61 through line 54. Optionally hydrogen may be injected into reactor 61 through line 55. Any combination of the six lines that feed reactor 61 (lines 51 through 55 and line RF51) may or may not be heated or cooled.

The continuous solution polymerization process in FIG. 2 shows a non-limiting example of two reactors, reactor 61 and reactor 62. The number of reactors is not particularly important to the success of this invention, providing there is at least one reactor. Fresh feeds are injected into reactor 62. Solvent 56, ethylene 57 and optional α-olefin 58 are combined to produce reactor feed RF52, which is injected into reactor 62. Catalyst is injected into reactor 62 through line 59. The catalyst injected into reactor 62 may be the same or different from the catalyst injected in reactor 61. Optionally hydrogen may be injected into reactor 62 via line 60. Any combination of the six lines that feed reactor 62 (lines 56 through 60 and line RF52) may or may not be heated or cooled.

The continuous solution polymerization reactors 61 and 62, shown in FIG. 2, may be operated over a wide range of temperatures and pressures. For example, the upper limit on reactor temperature may be 300° C., in some cases 280° C., and in other cases 260° C.; and the lower limit on reactor temperature may be 80° C., in some cases 100° C., and in other cases 125° C. Typically, reactor 62 (the second reactor) is operated at a slightly higher temperature than reactor 61; e.g., reactor 62 is typically 5° C. to 25° C. hotter than reactor 61. The reactor residence time is typically less than 15 minutes, in some cases less than 10 minutes and in other cases less than 5 minutes. The operating pressure of reactors 61 and 62 can vary over a wide range. For example, the upper limit on reactor pressure may be 45 MPag, in some cases 30 MPag, and in other cases 20 MPag; and the lower limit on reactor pressure may be 3 MPag, in some cases 5 MPag, and in other cases 7 MPag.

The continuous solution polymerization reactors 61 and 62, shown in FIG. 2, produce stream 63 which contains an ethylene polymer in a single liquid phase solution, or optionally, under some operational circumstances a two liquid phase solution. Stream 63 may also contain ethylene, active catalyst, deactivated catalyst, optional α-olefin, optional hydrogen and light-end impurities if present.

A tank 64 contains a catalyst deactivator. Non-limiting examples of the contents of tank 64 include: neat (100%) catalyst deactivator, a solution of catalyst deactivator in a solvent, and; a slurry of catalyst deactivator in a liquid. Non-limiting examples of suitable solvents and liquids include linear or branched $C_5$ to $C_{12}$ alkanes. How the catalyst deactivator is added is not particularly important to the success of this invention. Once added, the catalyst deactivator substantially stops the polymerization reaction, by changing the active catalyst to an inactive form. Catalyst deactivators are well known in the art, non-limiting examples include: amines; alkali or alkaline earth metal salts of carboxylic acids; water; hydrotalcites; alcohols, and; carboxylic acids. In general, the catalyst deactivator is added in the minimal amount required to substantially deactivate the catalyst and quench the polymerization reaction. A minimal amount of catalyst deactivator minimizes cost and minimizes the amount of un-reacted catalyst deactivator present in process streams.

The number of reactors is not particularly important to the success of this invention. In addition, the shape or design of the reactors is not particularly important; for example, unstirred or stirred spherical, cylindrical or tank-like vessels could be used, as well as recirculating loop reactors or tubular reactors. An additional embodiment includes the addition of one or more tubular reactors after the second reactor 62 shown in FIG. 2, as described in U.S. Pat. No. 8,101,693 issued Jan. 24, 2012 to Van Asseldonk et al., assigned to NOVA Chemicals (International) S.A., i.e. stream 63 would flow into the tubular reactor(s) and the stream exiting the tubular reactor(s) would be deactivated forming stream 65.

Adding the catalyst deactivator to stream 63 produces a deactivated reactor solution, stream 65. Stream 65 passes through pressure let down device 66, heat exchanger 67, pressure let down device 68, forming a lower pressure and higher temperature deactivated reactor solution 69 that enters a first V/L separator 70. Prior to entering the first V/L separator, the deactivated reactor solution 69 may have a maximum temperature of 300° C., in some cases 290° C. and in other cases 280° C.; while the minimum temperature of the deactivated reactor solution prior to entering the first V/L separator could be 150° C., in some cases 200° C. and in other cases 220° C. Prior to entering the first V/L separator, the deactivated reactor solution 69 may have a maximum pressure of 40 MPag, in some cases 25 MPag, and in other cases 15 MPag; while the minimum pressure could be 1.5 MPag, in some cases 5 MPag, and in other cases 6 MPag.

In the first V/L separator 70 two streams are formed: a first bottom stream 74, comprised of an ethylene polymer rich solvent, ethylene, deactivated catalyst and optional α-olefin, and; a first gaseous overhead stream 71 comprised of ethylene, solvent, oligomers, optional α-olefins, optional hydrogen and light-end impurities if present. The first V/L separator 70 may be operated over a relatively broad range of temperatures and pressures. For example, the maximum operating temperature of the first V/L separator may be 300° C., in some cases 285° C., and in other cases 270° C.; while the minimum operating temperature of the first V/L separator may be 100° C., in some cases 140° C. and in other cases 170° C. The maximum operating pressure of the first V/L separator may be 20 MPag, in some cases 10 MPag, and in other cases 5 MPag; while the minimum operating pressure of the first V/L separator may be 1 MPag, in some cases 2 MPag, and in other cases 3 MPag.

In FIG. 2, 100% of the first gaseous overhead stream 71 passes through pressure control valve 72 and is sent to a distillation column through line 73.

The first bottom stream 74 passes through level control valve 75 and enters a second V/L separator 76. In the second V/L separator two streams are formed: a second bottom stream 77 comprising an ethylene polymer, solvent, ethylene, deactivated catalyst and optional α-olefins; and a second gaseous overhead stream 79 comprised essentially of solvent, ethylene, optional α-olefins, ethylene and impurities if present. The second V/L separator 76 may be operated over a relatively broad range of temperatures and pressures. For example, the maximum operating temperature of the second V/L separator may be 300° C., in some cases 250° C., and in other cases 200° C.; while the minimum operating temperature of the second V/L separator may be 100° C., in some cases 125° C. and in other cases 150° C. The maximum operating pressure of the second V/L separator may be 1000 kPag, in some cases 900 kPag, and in other cases 800 kPag; while the minimum operating pressure of the second V/L separator may be 10 kPag, in some cases 20 kPag, and in other cases 30 kPag.

The second bottom stream 77 flows into a third V/L separator 78. The third V/L separator may be operated over a relatively broad range of temperatures and pressures. For example, the maximum operating temperature of the third V/L separator may be 300° C., in some cases 250° C., and in other cases 200° C.; while the minimum operating temperature of the third V/L separator may be 100° C., in some cases 125° C. and in other cases 150° C. The maximum operating pressure of the third V/L separator may be 500 kPag, in some cases 150 kPag, and in other cases 100 kPag; while the minimum operating pressure of the third V/L separator may be 1 kPag, in some cases 10 kPag, and in other cases 25 kPag. In the third V/L separator two streams are formed: a third bottom stream P2, comprised essentially of a molten ethylene polymer and deactivated catalyst, and; a third gaseous overhead stream 81 comprised of solvent, optional α-olefins, ethylene and impurities if present.

The third bottom stream, P2, proceeds to polymer recovery. Polymer recovery operations are not particularly important to the success of this invention. Non-limiting examples of polymer recovery operations include one or more gear pump, single screw extruder, twin screw extruder or devolatilizing extruder that force the molten ethylene polymer through a pelletizer. A devolatilizing extruder may be used to remove small amounts of solvent, ethylene and optional α-olefin if present. Once pelletized the solidified ethylene polymer is optionally dried and generally transported to a product silo.

As shown in FIG. 2, the second gaseous overhead stream 79, produced in the second V/L separator 76, and the third gaseous overhead stream 81, produced in the third V/L separator 78, pass through pressure control valves 80 and 82, respectively, and are combined to form stream 83. Stream 83 is condensed in condenser 84 forming a condensed recovered solvent stream 85. The recovered solvent stream is collected in a recovered solvent drum 86. The recovered solvent drum is vented to a flare through vent line 87. The maximum operating temperature of the recovered solvent drum may be 60° C., in some cases 50° C., and in other cases 25° C.; while the minimum operating temperature of the recovered solvent drum may be −25° C., in some cases −10° C. and in other cases 0° C. The maximum operating pressure of the recovered solvent drum may be 100 kPag, in some cases 50 kPag, and in other cases 20 kPag; while the minimum operating pressure of the recovered solvent drum may be 0.1 kPag, in some cases 0.5 kPag, and in other cases 1 kPag.

In the inventive continuous solution process, as the recovered solvent exits the recovered solvent drum a recovered solvent stream 88 is formed, which enters a recovery pump 89. The recovery pump output stream 90 is split into two streams, FL51 and FL52, using flow controllers 91 and 92, respectively. Stream FL51 is passed to a distillation column; while stream FL52 is passed to a purification column.

Operationally, the recovered solvent flow through line FL52, see FIG. 2, may vary from 100% to 0%; given these two operational extremes, the corresponding flows through line FL51 must be 0% and 100%, respectively. An inventive lower operating cost solution polymerization plant results, as the flow through line FL52 increases. For example, in some cases more than 60% of the recovered solvent may flow through line FL52; in other cases more than 90% of the recovered solvent may flow through line FL52, and; in still other cases more than 99% of the recovered solvent may flow through line FL52. As the recovered solvent flow through line FL52 increases, energy savings increase, reducing the operational costs of the continuous solution polymerization plant. In addition, increasing the flow of recovered solvent through line FL52 allows one to reduce the size and capacity of the distillation column, or columns, reducing the overall capital cost of the continuous solution polymerization plant.

In some cases, a small purge flow, i.e. not more than 5% of the recovered solvent flows through line FL51, may be advantageous if heavy impurities enter the process and build up in recovered solvent drum 86. Such a purge flow allows one to remove heavier impurities from the continuous solution polymerization process in the distillation column. Non-limiting example of heavier impurities include linear or branched, saturated or unsaturated $C_8$ to $C_{30}$ hydrocarbons.

Provided that catalyst deactivating impurities are removed in a purification step, the number of purification beds or columns, or the arrangement of the purification beds or columns (parallel or series) are not particularly important to the success of this invention. Non-limiting examples of deactivating impurities include oxygenates such as:

water, fatty acids, alcohols, ketones, aldehydes. A non-limiting embodiment of a purification step includes parallel purification columns 93a and 93b, as shown in FIG. 2. For example, purification column 93a could be on-line, converting stream FL52 into a purified solvent stream 94; while purification column 93b is off-line for regeneration or replacement of exhausted adsorption medium if not regenerable. Similarly, purification column 93b could be on-line, while purification column 93a is off-line; or both purification columns 93a and 93b could be on-line.

Suitable adsorbent materials to remove potential catalyst deactivating poisons are well known to experienced artisans. A non-limiting example of a suitable adsorbent to remove oxygenates is a bed of AZ-300 adsorbent available from UOP LLD, A Honeywell Company, 25 East Algonquin Road, Des Plaines, Ill. AZ-300 is also effective in removing trace levels of chloride impurities and carbon dioxide if present in stream FL52. AZ-300 is a homogeneous combination of modified activated alumina and zeolitic molecular sieve absorbents, which can be regenerated using hot nitrogen gas. An additional non-limiting example of suitable absorbents is a combination bed of AZ-300, at bed inlet, and CG-731 or CG-734, at bed outlet. CG-731 and CG-734 are available from UOP LLD, A Honeywell Company, 25 East Algonquin Road, Des Plaines, Ill. CG-731 and CG-734 absorbents are effective in removing higher levels of carbon dioxide. CG-731 and CG-734 can be regenerated with hot nitrogen gas. An additional non-limiting example of a suitable absorbent to remove oxygenates is a mixed bed of Selexsorb CD and Selexsorb CDO available from BASF Corporation, Iselin, N.J., USA. Both Selexsorb CD and CDO are comprised of activated alumina and can be regenerated using hot nitrogen gas.

Optionally, the purified solvent stream 94 passes through an analytical device 95 where the chemical composition of the purified solvent stream is determined. The purified solvent stream is collected in a purified solvent drum 96. Depending on operational circumstances, the purified solvent drum 96 may have a maximum temperature of 60° C., in some cases 50° C. and in other cases 25° C.; while the minimum temperature of the purified solvent drum may be −25° C., in some cases −10° C., and in other cases 0° C. The maximum pressure of the purified solvent drum may be 3 MPag, in some cases 2 MPag and in other cases 1 MPag; while the minimum pressure of the purified solvent drum may be 0.1 MPag, in some cases 0.2 MPag, and in other cases 0.3 MPag.

As shown in FIG. 2, the solvent in purified solvent drum 96 is passed through a high pressure pump 97, forming a pressurized solvent stream 98. The pressurized solvent stream may have a maximum temperature of 120° C., in some cases 80° C. and in other cases 60° C.; while the minimum temperature of pressurized solvent stream may be −25° C., in some cases −10° C., and in other cases 0° C. The maximum pressure of the pressurized solvent stream may be 45 MPag, in some cases 35 MPag and in other cases 25 MPag; while the minimum pressure of the pressurized solvent stream may be 3 MPag, in some cases 5 MPag, and in other cases 7 MPag.

One or more flow controllers are used to distribute the pressurized solvent stream 98 to one or more upstream reactors. FIG. 2 shows a non-limiting example of two upstream reactors, reactor 61 and reactor 62. In FIGS. 2, 0 to 100% of the pressurized solvent stream 98 passes through flow controller 99, forming recycled solvent stream RS1 which is injected into the first upstream reactor 61; the remaining pressurized solvent stream passes through flow controller 100, forming recycle stream RS2 which is injected into the second upstream reactor 62. One of, or both of, recycled solvent streams RS1 and RS2 may be heated or cooled prior to injection into upstream reactors 61 and 62, respectively. Optionally, recycle streams RS1 and RS2 may be flow controlled as desired and added to reactor feed lines RF51 and RF52, respectively, prior to injection into reactors 61 and 62, respectively. One of, or both of, reactor feed lines RF51 and RF52 may be heated or cooled prior to injection into upstream reactors 61 and 62, respectively.

An additional embodiment of this invention includes a continuous solution polymerization process consisting of two vapor/liquid separators, i.e. the third V/L separator 78 shown in FIG. 2 is eliminated. This embodiment is clearly specified by the following comments and references to FIG. 2: a) the third V/L separator 78 shown in FIG. 2 is eliminated; b) this eliminates the third gaseous overhead stream 81, and pressure control valve 82; c) as a result, stream 83 is limited to the contents of the second gaseous overhead stream 79, and; d) the second bottom stream 77, produced in the second V/L separator 76, passes directly to polymer recovery operations. This embodiment reduces the capital cost of the solution polymerization plant, primarily through the elimination of the third V/L separator 78, as well as reducing the size and capacity of the distillation column, or columns.

Additional embodiments of this invention also include continuous solution polymerization processes comprised of more than three vapor/liquid (V/L) separators. As a non-limiting example, in the case of four V/L separators, gaseous overhead streams from a second, a third and a fourth V/L separator are be combined, condensed, purified and recycled to the upstream polymerization reactors; while a fourth bottom stream, produced in the fourth V/L separator, is forwarded to a polymer recovery operation.

The catalysts suitable for use in the present invention are not particularly limited. The invention can be used with any metallocene or single site catalyst (SSC), Ziegler-Natta catalyst, chromium catalyst or any other organometallic catalyst capable of polymerizing olefins in a solution process. Generally, the catalyst components may be premixed in the process solvent or catalyst components may be fed as separate streams to each reactor. In some instances premixing catalyst components may be desirable to provide a reaction time for the catalyst components prior to entering the reaction. Such an "in line mixing" technique is described in a number of patents in the name of DuPont Canada Inc (e.g. U.S. Pat. No. 5,589,555, issued Dec. 31, 1996). The term "Ziegler-Natta catalyst" is well known to those skilled in the art and is used herein to convey its conventional meaning. Ziegler-Natta catalysts are suitable for injection through lines 4 and 9 in FIG. 1, or through lines 54 and 59 in FIG. 2. Ziegler-Natta catalyst systems comprise: at least one transition metal compound wherein the transition metal is selected from groups 3, 4 or 5 of the Periodic Table (using IUPAC nomenclature), non-limiting examples include $TiCl_4$ and titanium alkoxides $(Ti(OR_1)_4)$ where $R_1$ is a lower $C_{1-4}$ alkyl radical; and an organoaluminum component, which is defined by $(Al(X')_a(OR_2)_b(R_3)_c)$, wherein, X' is a halide (preferable chlorine), $OR_2$ is an alkoxy or aryloxy group; $R_3$ is a hydrocarbyl (preferably an alkyl having from 1 to 10 carbon atoms) and a, b, or c are each 0, 1, 2 or 3 with the provisos, $a+b+c=3$ and $b+c=1$. As will be appreciated by those skilled in the art, conventional Ziegler Natta catalysts frequently incorporate additional components. For example, an amine or a magnesium compound or a magnesium alkyl such as butyl ethyl magnesium and a halide source (which is typically a chloride, e.g. tertiary butyl chloride). The Ziegler-Natta catalyst may also include an electron donor, e.g., an ether such as tetrahydrofuran, etc. Such components, if employed, may be added to the other catalyst components prior to introduction to the reactor or may be directly added to the reactor. The Ziegler Natta catalyst may also be "tempered" (i.e. heat treated) prior to being introduced to the reactor (again, using techniques which are well known to those skilled in the art and published in the literature). There is a large amount of art disclosing these catalyst and the components and the sequence of addition may be varied over broad ranges.

Single site catalysts are also suitable catalysts for injection through lines 4 and 9 in FIG. 1, or through lines 54 and 59 in FIG. 2. The term "single site catalyst" refers to a catalyst system that produces homogeneous ethylene polymers; which may or may not contain long chain branching. There is a large amount of art disclosing single site catalyst systems, a non-limiting example includes the bulky ligand single site catalyst of the formula:

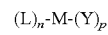

$$(L)_n\text{-}M\text{-}(Y)_p$$

wherein M is selected from the group consisting of Ti, Zr, and Hf; L is a monoanionic ligand independently selected from the group consisting of cyclopentadienyl-type ligands, and a bulky heteroatom ligand containing not less than five atoms in total (typically of which at least 20%, preferably at least 25% numerically are carbon atoms) and further containing at least one heteroatom selected from the group consisting of boron, nitrogen, oxygen, phosphorus, sulfur and silicon, said bulky heteroatom ligand being sigma or pi-bonded to M; Y is independently selected from the group consisting of activatable ligands; n may be from 1 to 3; and p may be from 1 to 3, provided that the sum of n+p equals the valence state of M, and further provided that two L ligands may be bridged.

Non-limiting examples of bridging groups include bridging groups containing at least one Group 13 to 16 atom, often referred to as a divalent moiety such as, but not limited to, at least one of a carbon, oxygen, nitrogen, silicon, boron, germanium and tin atom or a combination thereof. Preferably the bridging group contains a carbon, silicon or germanium atom, most preferably at least one silicon atom or at least one carbon atom. The bridging group may also contain substituent radicals, including halogens.

Some bridging groups include but are not limited to a di $C_{1-6}$ alkyl radical (e.g. alkylene radical for example an ethylene bridge), di $C_{6-10}$ aryl radical (e.g. a benzyl radical having two bonding positions available), silicon or germanium radicals substituted by one or more radicals selected from the group consisting of $C_{1-6}$ alkyl, $C_{6-10}$ aryl, phosphine or amine radical which are unsubstituted or up to fully substituted by one or more $C_{1-6}$ alkyl or $C_{6-10}$ aryl radicals, or a hydrocarbyl radical such as a $C_{1-6}$ alkyl radical or a $C_{6-10}$ arylene (e.g. divalent aryl radicals); divalent $C_{1-6}$ alkoxide radicals (e.g. —$CH_2CHOHCH_2$—) and the like.

Exemplary of the silyl species of bridging groups are dimethylsilyl, methylphenylsilyl, diethylsilyl, ethylphenylsilyl or diphenylsilyl compounds. Most preferred of the bridged species are dimethylsilyl, diethylsilyl and methylphenylsilyl bridged compounds.

Exemplary hydrocarbyl radicals for bridging groups include methylene, ethylene, propylene, butylene, phenylene and the like, with methylene being preferred.

Exemplary bridging amides include dimethylamide, diethylamide, methylethylamide, di-t-butylamide, diisoproylamide and the like.

The term "cyclopentadienyl", frequently abbreviated as "Cp", refers to a 5-member carbon ring having delocalized bonding within the ring and typically being bound to the active catalyst site, generally a group 4 metal (M) through $\eta_5$-bonds. The cyclopentadienyl ligand may be unsubstituted or up to fully substituted with one or more substituents selected from the group consisting of $C_{1-10}$ hydrocarbyl radicals in which hydrocarbyl substituents are unsubstituted or further substituted by one or more substituents selected from the group consisting of a halogen atom and a $C_{1-4}$ alkyl radical; a halogen atom; a $C_{1-8}$ alkoxy radical; a $C_{6-10}$ aryl or aryloxy radical; an amido radical which is unsubstituted or substituted by up to two $C_{1-8}$ alkyl radicals; a phosphido radical which is unsubstituted or substituted by up to two $C_{1-8}$ alkyl radicals; silyl radicals of the formula —Si—$(R)_3$ wherein each R is independently selected from the group consisting of hydrogen, a $C_{1-8}$ alkyl or alkoxy radical, and $C_{6-10}$ aryl or aryloxy radicals; and germanyl radicals of the formula —Ge—$(R)_3$ wherein R is as defined above.

Typically, the cyclopentadienyl-type ligand is selected from the group consisting of a cyclopentadienyl radical, an indenyl radical and a fluorenyl radical where the radicals are unsubstituted or up to fully substituted by one or more substituents selected from the group consisting of a fluorine atom, a chlorine atom; $C_{1-4}$ alkyl radicals; and a phenyl or benzyl radical which is unsubstituted or substituted by one or more fluorine atoms.

If none of the L ligands is bulky heteroatom ligand then the catalyst could be a bis-Cp catalyst (a traditional metallocene) or a bridged constrained geometry type catalyst or tris-Cp catalyst.

If the catalyst contains one or more bulky heteroatom ligands the catalyst would have the formula:

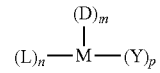

wherein M is a transition metal selected from the group consisting of Ti, Hf and Zr; D is independently a bulky heteroatom ligand (as described below); L is a monoanionic ligand selected from the group consisting of cyclopentadienyl-type ligands; Y is independently selected from the group consisting of activatable ligands; m is 1 or 2; n is 0, 1 or 2; p is an integer; and the sum of m+n+p equals the valence state of M, provided that when m is 2, D may be the same or different bulky heteroatom ligands.

For example, the catalyst may be a bis(phosphinimine), or a mixed phosphinimine ketimide dichloride complex of titanium, zirconium or hafnium. Alternately, the catalyst could contain one phosphinimine ligand or one ketimide ligand, one "L" ligand (which is most preferably a cyclopentadienyl-type ligand) and two "Y" ligands (which are preferably both chloride).

The preferred metals (M) are from Group 4 (especially titanium, hafnium or zirconium) with titanium being most preferred. In one embodiment the catalysts are group 4 metal complexes in the highest oxidation state.

Bulky heteroatom ligands (D) include but are not limited to phosphinimine ligands (PI) and ketimide (ketimine) ligands.

The phosphinimine ligand (PI) is defined by the formula:

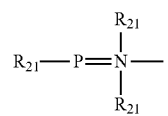

wherein each $R_{21}$ is independently selected from the group consisting of a hydrogen atom; a halogen atom; $C_{1-20}$, preferably $C_{1-10}$ hydrocarbyl radicals which are unsubstituted by or further substituted by a halogen atom; a $C_{1-8}$ alkoxy radical; a $C_{6-10}$ aryl or aryloxy radical; an amido radical; a silyl radical of the formula: —Si—$(R_{22})_3$, wherein each $R_{22}$ is independently selected from the group consisting of hydrogen, a $C_{1-8}$ alkyl or alkoxy radical, and $C_{6-10}$ aryl or aryloxy radicals; and a germanyl radical of the formula: —Ge—$(R_{22})_3$, wherein $R_{22}$ is as defined above.

The preferred phosphinimines are those in which each $R_{21}$ is a hydrocarbyl radical, preferably a $C_{1-6}$ hydrocarbyl radical.

Suitable phosphinimine catalysts are Group 4 organometallic complexes which contain one phosphinimine ligand (as described above) and one ligand L which is either a cyclopentadienyl-type ligand or a heteroatom ligand.

As used herein, the term "ketimide ligand" refers to a ligand which:
(a) is bonded to the transition metal via a metal-nitrogen atom bond;

(b) has a single substituent on the nitrogen atom (where this single substituent is a carbon atom which is doubly bonded to the N atom); and (c) has two substituents $Sub_1$ and $Sub_2$ (described below) which are bonded to the carbon atom.

Conditions a, b and c are illustrated below:

Where the substituents $Sub_1$ and $Sub_2$ may be the same or different and may be further bonded together through a bridging group to form a ring. Exemplary substituents include hydrocarbyls having from 1 to 20 carbon atoms, preferably from 3 to 6 carbon atoms, silyl groups (as described below), amido groups (as described below) and phosphido groups (as described below). For reasons of cost and convenience it is preferred that these substituents both be hydrocarbyls, especially simple alkyls and most preferably tertiary butyl.

Suitable ketimide catalysts are Group 4 organometallic complexes which contain one ketimide ligand (as described above) and one ligand L which is either a cyclopentadienyl-type ligand or a heteroatom ligand.

The term bulky heteroatom ligand (D) is not limited to phosphinimine or ketimide ligands and includes ligands which contain at least one heteroatom selected from the group consisting of boron, nitrogen, oxygen, phosphorus, sulfur and silicon. The heteroatom ligand may be sigma or pi-bonded to the metal. Exemplary heteroatom ligands include silicon-containing heteroatom ligands, amido ligands, alkoxy ligands, boron heterocyclic ligands and phosphole ligands, as all described below.

Silicon containing heteroatom ligands are defined by the formula: —(Y)$SiR_xR_yR_z$ wherein the — denotes a bond to the transition metal and Y is sulfur or oxygen. The substituents on the Si atom, namely $R_x$, $R_y$, and $R_z$, are required in order to satisfy the bonding orbital of the Si atom. The use of any particular substituent $R_x$, $R_y$, or $R_z$ is not especially important to the success of this invention. It is preferred that each of $R_x$, $R_y$ and $R_z$ is a $C_{1-2}$ hydrocarbyl group (i.e. methyl or ethyl) simply because such materials are readily synthesized from commercially available materials.

The term "amido" is meant to convey its broad, conventional meaning. Thus, these ligands are characterized by (a) a metal-nitrogen bond; and (b) the presence of two substituents (which are typically simple alkyl or silyl groups) on the nitrogen atom.

The terms "alkoxy" and "aryloxy" are also intended to convey their conventional meanings. Thus, these ligands are characterized by (a) a metal oxygen bond; and (b) the presence of a hydrocarbyl group bonded to the oxygen atom. The hydrocarbyl group may be a $C_{1-10}$ straight chained, branched or cyclic alkyl radical or a $C_{6-13}$ aromatic radical where the radicals are unsubstituted or further substituted by one or more $C_{1-4}$ alkyl radicals (e.g. 2,6 di-tertiary butyl phenoxy).

Boron heterocyclic ligands are characterized by the presence of a boron atom in a closed ring ligand. This definition includes heterocyclic ligands which also contain a nitrogen atom in the ring. These ligands are well known to those skilled in the art of olefin polymerization and are fully described in the literature (see, for example, U.S. Pat. Nos. 5,637,659; 5,554,775; and the references cited therein).

The term "phosphole" is also meant to convey its conventional meaning. Phospholes are cyclic dienyl structures having four carbon atoms and one phosphorus atom in the closed ring. The simplest phosphole is $C_4PH_4$ (which is analogous to cyclopentadiene with one carbon in the ring being replaced by phosphorus). The phosphole ligands may be substituted with, for example, $C_{1-20}$ hydrocarbyl radicals (which may, optionally, contain halogen substituents); phosphido radicals; amido radicals; or silyl or alkoxy radicals. Phosphole ligands are also well known to those skilled in the art of olefin polymerization and are described as such in U.S. Pat. No. 5,434,116 (Sone, to Tosoh).

The current invention also contemplates the use of chromium catalysts that are also well known in the art. The term "chromium catalysts" describes olefin polymerization catalysts comprising a chromium species, such as silyl chromate, chromium oxide, or chromocene on a metal oxide support such as silica or alumina. Suitable cocatalysts for chromium catalysts, are well known in the art, non-limiting examples include trialkylaluminum, alkylaluminoxane, dialkoxyalkylaluminum compounds and the like.

Example

The present invention will now be illustrated by the following non-limiting example. Computer simulations of the continuous solution polymerization processes shown in FIGS. 1 and 2 were performed using Aspen Plus v7.1 and v7.2 computer software available from AspenTech. A second software program, VLXE, an Excel-based thermodynamic program from the VLXE company, was used as a supplemental program. AspenTech's Aspen Simulation Workbook program was used for programming the data exchange between Excel and the Aspen software.

Aspen Plus and VLXE were used to model a portion of the process from the reactor outlet, stream 13 in FIG. 1 and stream 63 in FIG. 2, through distillation and solvent recycling operations, but excluding polymer recovery. Extensive data was gathered from process data historians, process stream sampling and field instrument measurements to benchmark the Aspen PlusNLXE model in order to develop a steady-state base case model that closely predicts typical process conditions for the portions of the process modeled.

For the base case, FIG. 1, energy consumption was calculated by summing the energy consumed by all discrete users in the form of: low pressure steam (kW), hereafter LP steam; high pressure steam (kW), hereafter HP steam, and; Power (kW). Users included all major energy consumers, e.g. heat exchangers, pumps and air cooler fans, etc. The base case simulation model, FIG. 1, was then modified to simulate the inventive embodiment shown in FIG. 2.

Relative to the base case shown in FIG. 1, the inventive embodiment shown in FIG. 2 includes the following additional steps: flow controllers 91 and 92 split the recovered solvent stream 90 into two streams FL51 and FL52, respectively; the recovered solvent in line FL52 passes through a purification column, forming a purified solvent that is stored in a purified solvent drum 96; the purified solvent is passed through a high pressure pump 97, forming a pressurized solvent stream 98; the pressurized solvent passes through flow controllers 99 and 100, and is injected into upstream reactors 61 and 62, respectively. As a result, the recovered solvent that flows through line FL52 by-passes the energy intensive distillation column(s). In contrast, in the base case FIG. 1, 100% of the recovered solvent is sent to a downstream distillation column through line FL1.

For the embodiment shown in FIG. 2, the energy consumption (kW) for each utility (LP steam, HP steam and Power) was calculated by summing the energy consumed by all users (heat exchanges, pumps and air cooler fans, etc.) and compared with the energy consumed in the base case FIG. 1. In the inventive embodiment, FIG. 2, the recycling of the recovered solvent to the upstream reactors reduced the energy consumption for all users, primarily due to the reduced flow of recovered solvent to the downstream distillation operation through line FL51. Table 1 summarizes the energy savings associated with the embodiment shown in FIG. 2 or the "Recycle Case", relative to FIG. 1 or the "Base Case".

Table 1 summarizes the flows via each route (or process line), as a percentage of the maximum possible flow. In Table 1's Base Case column the flow through FL1 is 100%, i.e. 100% of the solvent in the recovered solvent drum 36 is sent to the distillation column. In Table 1's Recycle Case column, the flow through FL51 is 0% and the flow through FL52 is 100%, i.e. 100% of the solvent in the recovered solvent drum 86 is recycled to the upstream polymerization reactors.

In Table 1's Recycle Case (inventive FIG. 2), the energy reductions relative to the Base Case are as follows: LP steam usage is reduced by 30%, HP steam usage is reduced by 44% and Power usage is reduced by 13%. Energy consumption is primarily reduced due to the reduced load on distillation. This example of a FL52 flow of 100%, or 100% recycle to the upstream reactors, quantifies the maximum energy reduction, or savings in energy.

Operationally, in FIG. 2, the recovered solvent flow through line FL52 may vary from 100% to 0%; given these two operational extremes, the corresponding flows through line FL51 must be 0% and 100%, respectively. An inventive lower operating cost solution polymerization process results as the flow through line FL52 increases. For example, in some cases more than 60% of the recovered solvent may flow through line FL52; in other cases more than 90% of the recovered solvent may flow through line FL52, and; in still other cases more than 99% of the recovered solvent may flow through line FL52. As the recovered solvent flow through line FL52 increases, the energy savings increase, reducing the operational costs of the continuous solution polymerization plant. In addition, increasing the flow of recovered solvent through line FL52 allows one to reduce the size and capacity of the distillation column, or columns, reducing the overall capital cost of the continuous solution polymerization plant.

In some cases, a small purge flow of not more than 5% through line FL51 may be advantageous if heavy impurities enter the process and build up in recovered solvent drum 86. Such a purge flow allows one to remove heavier impurities from the continuous solution polymerization process in the distillation column. Non-limiting example of heavier impurities include linear or branched, saturated or unsaturated, $C_8$ to $C_{30}$ hydrocarbons.

TABLE 1

Solution polymerization process energy simulations; energy savings due to solvent recycling relative to the base case

| FIG. 1: Base Case | | FIG. 2: Recycle Case | |
|---|---|---|---|
| Process Flow | Flow (% of maximum flow) | Process Flow | Flow (% of maximum flow) |
| Flow FL1 | 100% | Flow FL51 | 0% |
| | | Flow FL52 | 100% |
| | | Flow RS1 | 0 to 100% |
| | | Flow RS2 | 0 to 100% |
| Flow RF1 | 100% | Flow RF51 | <100% |
| Flow RF2 | 100% | Flow RF52 | <100% |
| Energy Savings % Energy saved (kW) | | Energy Savings % Energy saved (kW) | |
| LP Steam | 0% | LP Steam | 30% |
| HP Steam | 0% | HP Steam | 44% |
| Power | 0% | Power | 13% |

INDUSTRIAL APPLICABILITY

The industrial applicability of this invention is continuous solution polymerization process that produces polyethylenes wherein energy consumption is reduced, capital costs are reduced and resources are conserved.

The invention claimed is:

1. An improved continuous solution polymerization process wherein energy consumption is reduced, comprising:
   i) injecting ethylene, one or more aliphatic hydrocarbon solvents, a catalyst, optionally one or more α-olefins and optionally hydrogen into one or more upstream reactors operating at a temperature and pressure to produce an ethylene polymer in a single liquid phase solution, or optionally a two liquid phase solution;
   ii) injecting a catalyst deactivator, downstream of said one or more upstream reactors, into said single liquid phase solution, or optionally said two liquid phase solution, forming a deactivated reactor solution;
   iii) passing said deactivated reactor solution through a heat exchanger to increase the temperature, passing said deactivated reactor solution through a pressure let down device and collecting said deactivated reactor solution in a first V/L separator forming a first bottom stream of ethylene polymer rich solvents, ethylene, deactivated catalyst and optional α-olefins and a first gaseous overhead stream of ethylene, solvent, oligomers, optional α-olefins and optional hydrogen;
   iv) passing said first gaseous overhead stream to a distillation column, and passing said first bottom stream to a second V/L separator wherein a second gaseous overhead stream and a second bottom stream are formed;
   v) passing said second bottom stream, comprising molten ethylene polymer and deactivated catalyst, to a polymer recovery operation and condensing said second gaseous overhead stream to form a recovered solvent comprised essentially of solvents, ethylene, optional α-olefins and impurities if present, and collecting said recovered solvent in a recovered solvent drum;
   vi) passing from 0% to 40% of said recovered solvent to said distillation column and passing the remainder of said recovered solvent through a purification column to remove impurities, if present, forming a purified solvent;

vii) optionally passing said purified solvent through an analytical device wherein chemical composition is determined and collecting said purified solvent in a purified solvent drum;

viii) passing said purified solvent through a high pressure pump forming a pressurized solvent stream and injecting said pressurized solvent stream into said one or more upstream reactors.

2. The process according to claim 1, wherein said one or more upstream reactors operate at a temperature from 80° C. to 300° C. and a pressure from 3 MPag to 45 MPag.

3. The process according to claim 2, wherein said one or more upstream reactors operate at a temperature from 100° C. to 280° C.

4. The process according to claim 3, wherein said one or more upstream reactors operate at pressures from 5 MPag to 30 MPag.

5. The process according to claim 2, wherein prior to entering said first V/L separator, in step iii), the temperature of said deactivated reactor solution is from 150° C. to 300° C. and the pressure of said deactivated reactor solution is from 1.5 MPag to 40 MPag.

6. The process according to claim 5, wherein prior to entering said first V/L separator, the temperature of said deactivated reactor solution is from 200° C. to 290° C.

7. The process according to claim 6, wherein prior to entering said first V/L separator, the pressure of said deactivated reactor solution is from 5 MPag to 25 MPag.

8. The process according to claim 5, wherein said first V/L separator operates at a temperature from 100° C. to 300° C. and a pressure from 1 MPag to 20 MPag.

9. The process according to claim 8, wherein said first V/L separator operates at a temperature from 140° C. to 285° C.

10. The process according to claim 9, wherein said first V/L separator operates at a pressure from 2 MPag to 10 MPag.

11. The process according to claim 8, wherein said second V/L separator operates at a temperature from 100° C. to 300° C. and a pressure from 1 kPag to 1000 kPag.

12. The process according to claim 11, wherein said second V/L separator operates at a temperature from 125° C. to 250° C.

13. The process according to claim 12, wherein said second V/L separator operates at a pressure from 10 kPag to 900 kPag.

14. The process according to claim 11, wherein said recovered solvent drum, in step v), is at a temperature from −25° C. to 60° C. and a pressure from 0.1 kPag to 100 kPag.

15. The process according to claim 14, wherein said recovered solvent drum is at a temperature from −10° C. to 50° C.

16. The process according to claim 15, wherein said recovered solvent drum is at a pressure from 0.5 kPag to 50 kPag.

17. The process according to claim 14, wherein not more than 10% of said recovered solvent, produced in step v), is passed to said distillation column and the remainder of said recovered solvent is passed through said purification column.

18. The process according to claim 14, wherein not more than 1% of said recovered solvent is passed to said distillation column and the remainder of said recovered solvent is passed through said purification column.

19. The process according to claim 14, wherein said purified solvent drum, in step vii), operates at a temperature from −25° C. to 60° C. and a pressure from 0.1 MPag to 3 MPag.

20. The process according to claim 19, wherein said pressurized solvent stream, formed in step viii), is at a temperature from −25° C. to 120° C. and a pressure from 3 MPag to 45 MPag.

21. The process according to claim 20, wherein said pressurized solvent stream is at a temperature from −10° C. to 80° C.

22. The process according to claim 21, wherein said pressurized solvent stream is at a pressure from 5 MPag to 35 MPag.

23. The process according to claim 20, wherein said one or more aliphatic hydrocarbon solvents are $C_5$ to $C_{12}$ alkanes; wherein said hydrocarbon solvents are linear or branched, or a mixture of linear and branched hydrocarbons.

24. The process according to claim 23, wherein said optional α-olefins are one or more $C_4$ to $C_8$ α-olefins.

25. The process according to claim 24, wherein said optional α-olefin is selected from the group consisting of 1-hexene and 1-octene.

26. The process according to claim 24, wherein 0% to 100% of said pressurized solvent stream, formed in step viii), is fed to a first upstream reactor, and remaining pressurized solvent stream is fed to a second upstream reactor.

27. The process according to claim 26, wherein said catalyst used to polymerize said ethylene and said optional α-olefins is a heterogeneous catalyst.

28. The process according to claim 26, wherein said catalyst used to polymerize said ethylene and said optional α-olefins is a homogeneous catalyst.

29. The process according to claim 26, wherein a homogeneous catalyst or a heterogeneous catalyst is fed to said first upstream reactor and a homogeneous catalyst or a heterogeneous catalyst is fed to said second upstream reactor.

30. An improved continuous solution polymerization process wherein energy consumption is reduced, comprising:

i) injecting ethylene, one or more aliphatic hydrocarbon solvents, a catalyst, optionally one or more α-olefins and optionally hydrogen into one or more upstream reactors operating at a temperature and pressure to produce an ethylene polymer in a single liquid phase solution, or optionally a two liquid phase solution;

ii) injecting a catalyst deactivator, downstream of said one or more upstream reactors, into said single liquid phase solution, or optionally said two liquid phase solution, forming a deactivated reactor solution;

iii) passing said deactivated reactor solution through a heat exchanger to increase the temperature, passing said deactivated reactor solution through a pressure let down device and collecting said deactivated reactor solution in a first V/L separator forming a first bottom stream of ethylene polymer rich solvents, ethylene, deactivated catalyst and optional α-olefins and a first gaseous overhead stream of ethylene, solvent, oligomers, optional α-olefins and optional hydrogen;

iv) passing said first gaseous overhead stream to a distillation column, and passing said first bottom stream to a second V/L separator wherein a second gaseous overhead stream and a second bottom stream are formed;

v) passing said second bottom stream to a third V/L separator wherein a third gaseous overhead stream and a third bottom stream are formed, passing said third bottom stream, comprising molten ethylene polymer and deactivated catalyst to a polymer recovery operation;

vi) combining and condensing said second and said third gaseous overhead streams to form a recovered solvent comprised essentially of solvents, ethylene, optional α-olefins and impurities if present, and collecting said recovered solvent in a recovered solvent drum;

vii) passing from 0% to 40% of said recovered solvent to said distillation column and passing the remainder of said recovered solvent through a purification column to remove impurities, if present, forming a purified solvent;

viii) optionally passing said purified solvent through an analytical device wherein chemical composition is determined and collecting said purified solvent in a purified solvent drum;

ix) passing said purified solvent through a high pressure pump forming a pressurized solvent stream and injecting said pressurized solvent stream into said one or more upstream reactors.

31. The process according to claim 30, wherein said one or more upstream reactors operate at a temperature from 80° C. to 300° C. and a pressure from 3 MPag to 45 MPag.

32. The process according to claim 31, wherein said one or more upstream reactors operate at a temperature from 100° C. to 280° C.

33. The process according to claim 32, wherein said one or more upstream reactors operate at pressures from 5 MPag to 30 MPag.

34. The process according to claim 31, wherein prior to entering said first V/L separator, in step iii), the temperature of said deactivated reactor solution is from 150° C. to 300° C. and the pressure of said deactivated reactor solution is from 1.5 MPag to 40 MPag.

35. The process according to claim 34, wherein prior to entering said first V/L separator the temperature of said deactivated reactor solution is from 200° C. to 290° C.

36. The process according to claim 35, wherein prior to entering said first V/L separator the pressure of said deactivated reactor solution is from 5 MPag to 25 MPag.

37. The process according to claim 34, wherein said first V/L separator operates at a temperature from 100° C. to 300° C. and a pressure from 1 MPag to 20 MPag.

38. The process according to claim 37, wherein said first V/L separator operates at a temperature from 140° C. to 285° C.

39. The process according to claim 38, wherein said first V/L separator operates at a pressure from 2 MPag to 10 MPag.

40. The process according to claim 37, wherein said second V/L separator operates at a temperature from 100° C. to 300° C. and a pressure from 10 kPag to 1000 kPag.

41. The process according to claim 40, wherein said second V/L separator operates at a temperature from 125° C. to 250° C.

42. The process according to claim 41, wherein said second V/L separator operates at a pressure from 20 kPag to 900 kPag.

43. The process according to claim 40, wherein said third V/L separator operates at a temperature from 100° C. to 300° C. and a pressure from 1 kPag to 500 kPag.

44. The process according to claim 43, wherein said third V/L separator operates at a temperature from 125° C. to 250° C.

45. The process according to claim 44, wherein said third V/L separator operates at a pressure from 10 kPag to 150 kPag.

46. The process according to claim 43, wherein said recovered solvent drum, in step vi), is at a temperature from −25° C. to 60° C. and a pressure from 0.1 kPag to 100 kPag.

47. The process according to claim 46, wherein said recovered solvent drum is at a temperature from −10° C. to 50° C.

48. The process according to claim 47, wherein said recovered solvent drum is at a pressure from temperature from 0.5 kPag to 50 kPag.

49. The process according to claim 46, wherein not more than 10% of said recovered solvent, formed in step vi), is passed to said distillation column and the remainder of said recovered solvent is passed through said purification column.

50. The process according to claim 46, wherein not more than 1% of said recovered solvent is passed to said distillation column and the remainder of said recovered solvent is passed through said purification column.

51. The process according to claim 46, wherein said purified solvent drum, in step viii), operates at a temperature from −25° C. to 60° C. and a pressure from 0.1 MPag to 3 MPag.

52. The process according to claim 51, wherein said pressurized solvent stream, formed in step ix), is at a temperature from −25° C. to 120° C. and a pressure from 3 MPag to 45 MPag.

53. The process according to claim 52, wherein said pressurized solvent stream is at a temperature from −10° C. to 80° C.

54. The process according to claim 53, wherein said pressurized solvent stream is at a pressure from 5 MPag to 35 MPag.

55. The process according to claim 52, wherein said one or more aliphatic hydrocarbon solvents are $C_5$ to $C_{12}$ alkanes; wherein said hydrocarbon solvents are linear or branched or a mixture of linear and branched hydrocarbons.

56. The process according to claim 55, wherein said optional α-olefins are one or more $C_4$ to $C_8$ α-olefins.

57. The process according to claim 56, wherein said optional α-olefin is selected from the group consisting of 1-hexene and 1-octene.

58. The process according to claim 56, wherein 0% to 100% of said pressurized solvent stream, formed in step ix), is fed to a first upstream reactor, and remaining pressurized solvent stream is fed to a second upstream reactor.

59. The process according to claim 58, wherein said catalyst used to polymerize said ethylene and said optional α-olefins is a heterogeneous catalyst.

60. The process according to claim 58, wherein said catalyst used to polymerize said ethylene and said optional α-olefins is a homogeneous catalyst.

61. The process according to claim 58, wherein a homogeneous catalyst or a heterogeneous catalyst is fed to said first upstream reactor and a homogeneous catalyst or a heterogeneous catalyst is fed to said second upstream reactor.

* * * * *